United States Patent Office 3,443,972
Patented May 13, 1969

3,443,972
METHOD FOR PRESERVING CANNED FOODSTUFFS
Gabriel Robert Di Marco, Kendall Park, N.J., John F. Hogan, Jr., San Francisco, Calif., and Hyman L. Schulman, Oradell, and Frede B. Strandskov, North Caldwell, N.J., assignors of one-half to the F & M Schaefer Brewing Company, and one-half to Washine Chemical Corporation, both corporations of New York
No Drawing. Continuation-in-part of application Ser. No. 384,793, July 23, 1964. This application Aug. 16, 1967, Ser. No. 660,935
Int. Cl. A23b
U.S. Cl. 99—182      2 Claims

ABSTRACT OF THE DISCLOSURE

A method is provided for the preservation of canned foodstuffs. The process comprises:
(a) Adding to the foodstuffs a compound of the formula:

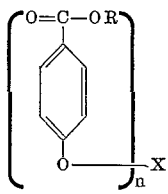

wherein

R represents an n-alkyl group of 7 to 8 carbon atoms;
X represents a member selected from the group consisting of hydrogen, alkali metal and alkaline earth metal; and
$n$ is an integer equal to the valence of X; or at least one compound of such formula in admixture with at least one compound of the formula:

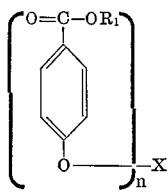

wherein $R_1$ represents an n-alkyl group of from 1 to 6 carbon atoms; and
X and $n$ have the previously indicated significances;

(b) Placing the foodstuff containing the said compound(s) into a container;
(c) Hermetically sealing said container; and
(d) Heat processing the container at a temperature and for a time period such that the amount of heat imparted to the foodstuff is significantly lower than that normally employed in preserving the foodstuff in the absence of the said compound.

---

This application is a continuation-in-part application of application Ser. No. 384,793, filed July 23, 1964, now abandoned.

This invention relates to the food canning industry and as its objective certain improvements relating to the preservation of canned foods.

In the food canning industry, it is necessary to conduct the processing operation in such a manner as to protect the health of the consumer as well as to prevent the spoilage of the food in order that the taste, color, texture and nutritional value of the food may be as high as possible. In protecting the health of the consumer the microbiological factor to be considered is toxin produced by spore-forming bacteria, as for example *Clostridium botulinum*. This *Clostridium* is toxic through the agency of an exotoxin. In other words, when the organism grows in a food, it elaborates a toxin. All of the other known food poisoning organisms, such as Salmonella, the Streptococci and the Staphylococci are nonspore formers. Although these others will grow in low and medium acid foods when inoculated into such substrates, their heat resistance is so low that they are not considered to be an important problem as far as canned food processes are concerned.

In respect to protecting against spoilage, it is noted that there are generally three groups of spore-forming spoilage organisms—a thermophilic (high-temperature loving) group, a mesophilic (medium-temperature loving) group, and a psychrophilic (low-temperature loving) group. There are various types of organisms falling within each of these groups causing various types of spoilage. The importance of each of these types will vary with the type of foodstuffs employed.

Considerable research has been done to uncover the most acceptable processing method for achieving both the protection of the public as well as the prevention of spoilage of the food. Experimenters have endeavored to achieve sterilization by steam injection, high temperature processing for very short periods of time, sonics, microwaves, radiation and other mechanical means. The addition of certain chemical preservatives including antibiotics, has also been considered from time to time. See Denny et al., Applied Microbiology, vol. 9, No. 2, pp. 108–110, March 1961.

Presently, however, the only acceptable method commercially employed in the canning industry is that of heat processing at temperatures sufficiently high and for periods sufficiently long to achieve the desired level of sterilization.

Among the problems encountered in the use of the above methods has been the unavoidable deterioration of flavor, color, texture, and the destruction of vitamin content arising out of the high processing or retorting temperatures for extensive lengths of time required to achieve the necessary level of sterilization. These relatively high temperatures which are detrimental to the organoleptic and nutritional qualities of the foodstuff are required if the sterilization of the contents is to be achieved with the necessary degree of certainty. In the event a method could be found in which lower temperatures and/or shorter processing times could be employed while maintaining the same degree of certainty of sterilization, the foodstuff could be improved with respect to taste, color, texture and nutritional content.

The nonchemical improvements noted above leave much to be desired. The foodstuff so processed is often only very slightly improved with respect to taste, color, texture and nutritional value as compared with the food receiving the customary heat treatment. In the cases where the degree of quality improvement is appreciable, the organoleptic and nutritional quality of the processed food is found to deteriorate in time. The instant invention constitutes an improved method over the previously known methods and may, if desired, be carried out in conjunction with the previously referred to mechanical methods to further improve the quality of the processed food.

Of the chemical preservatives which have been investigated for the purpose of preventing the spoilage of canned food, only a very few have shown any promise at all. These materials have always been utilized in conjunction with a relatively high degree of heating so that the quality of the pack in terms of taste, color, texture and nutritional value while improved in some cases is only slightly bettered in others. Heretofore, all of the additives which have been found to be effective are antibiotics. These antibiotics suffer from several disadvantages. As a class, these materials are very expensive and thus their use would appreciably increase the cost of processing. Many of the antibiotics are not suitable for use in commercial practice, since they are insufficiently heat-stable and decompose in the package. Those antibiotics which are heat-stable may sensitize certain persons upon repeated use.

The instant invention has as its object the provision of a method for obtaining the desired degree of sterilization of canned foods while at the same time avoiding the disadvantages of the prior art methods.

A further object of the instant invention is the provision of a method for preventing the spoilage of canned foodstuffs due to undesirable microbial growth, as for example, spore-forming bacteria, while at the same time avoiding the disadvantages of the prior art methods.

The above objects may be accomplished by incorporating into, for intimate admixture with the canned foodstuff, a microbial growth inhibiting amount of a compound of the formula:

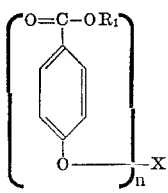

(I)

wherein
R represents a n-alkyl group of 7 to 8 carbon atoms;
X represents either a hydrogen atom (H); an alkali metal, e.g., sodium (Na) or potassium (K); or an alkaline earth metal, e.g. calcium (Ca); and
$n$ is an integer equal to the valence of X; or a mixture of one of the above compounds and at least one compound of the formula:

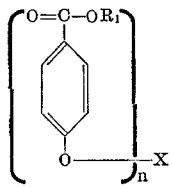

(II)

wherein
X and $n$ have the previously indicated significance; and
$R_1$ represents an n-alkyl group of 1 to 6 carbon atoms.

The esters of the instant invention are not antibiotics and thus the potential public health problem which is involved with the use of the antibiotics is not present with the use of the instant compounds. All of the esters are believed to be suitable from a toxicological and pharmacological standpoint for addition to the human diet in the amounts required for achieving the desired level of protection from spoilage due to microbiological growth. These esters are stable under heat conditions and are relatively simple synthetic organic chemical compounds which are lower in cost than the antibiotics which have been investigated in the past.

The esters either singly or mixtures thereof may be employed in conjunction with the mechanical treatments which have been used in the past for obtaining sterilization, i.e., heat, sonics, microwave, and radiation.

A particularly preferred aspect of the instant invention pertains to the employment of the esters of the instant invention or mixtures thereof in conjunction with strong heat. The degree of heat used and/or length of time heating is employed will vary, depending upon factors such as the nature of the foodstuff in question, the type of spoilage to which the food is susceptible, and the concentration and activity of the ester employed. However, the degree of heat and/or time for heating the foodstuff, containing the ester employed, will be substantially less than when the foodstuff is heated in the absence of the ester. The degree of heat and/or time necessary for sterilization of the foodstuff may be determined by a test run in which the particular foodstuff, mixed with the ester, is subjected to varying degrees of heat and lengths of time to determine the minimum heat and time required to provide sterilization.

Although it is impossible to define limits of degrees of heat and time, due to the above-mentioned factors, the preferred aspect of this invention relates to a strong, heat treatment of about 250° F. for about 5 minutes. A combination of degree of heat and length of time which gives a quantum of heat equal to the quantum of heat produced by heating the foodstuff at about 250° F. for 5 minutes is also a preferred aspect of this invention.

To illustrate this aspect of the invention, reference may be made to mushrooms which constitute an especially complex problem to the canning industry. Despite extremely thorough washing techniques and the employment of sanitary canning conditions, in order to prevent spoilage of the pack during shelf storage, it is necessary to process the canned mushrooms at a temperature of 250° F. for 18 to 30 minutes depending upon the size of the container normally used. Such extreme conditions are detrimental to the taste, color, texture, and nutritional value of the canned product. By adding to the pack, prior to sealing, a microbial growth inhibiting amount of one of the esters of Formula I, or a mixture of one of the esters of Formula I and at least one of the esters of Formula II, the desired level of sterilization may be achieved by processing the sealed pack in a manner that the quantum of heat applied is below that at which the taste, color, texture and/or nutritional value are normally markedly adversely affected. It is thus possible to place in the hands of the consumer a better product from the standpoint of teste, color, texture and nutritional value.

To further illustrate the applicability of the instant invention, attention is directed to the recent rise in the use of automatic vending machines dispensing hot canned foods such as soups and sauces and the like. This has created a problem from the standpoint of spoilage of the food stored in the machine. While in the machine, the canned product is stored at a temperature ranging from 110° to 130° F. and is heated just prior to dispensing to a temperature of about 150° F. Certain thermophilic bacteria which cause spoilage of foods show optimum growth at about the storage temperatures in these vending machines. Thus, unless special precautions are taken for the processing of products to be stored in these machines a great amount of spoilage is likely to occur. These precautions are not normally necessary for foods to be transported and stored under the standard conditions prevailing in the United States, since storage temperatures are much lower than 130° F. and the thermophilic bacterial growth is not encouraged as it is in the vending machines. The special precautions necessitated by these conditions can decrease the quality of the product, can be very expensive, and may involve special ingredients, equipment, process control and other measures. The instant invention provides a solution to this problem which does not involve great expense. By adding to the canned product a microbial growth inhibiting amount of a compound of Formula I or a mixture of one of the compounds of Formula I and at least one of the compounds of Formula II, and processing under conditions similar to or even less extreme than those commonly in use, a canned product is achieved which may be stored in the automatic vending machines at temperatures approximating the optimum growth conditions for thermophilic bacteria without spoilage resulting and which at the same time possesses superior taste, color, texture and nutritional value.

The amount of the ester or mixture of esters which is employed will of course vary depending upon the nature of the foodstuff in question. The degree of heat utilized with the specific foodstuff will also produce a variation in the amount used. Some foods are affected less by a high degree of heat than are others. It is possible with these foods to utilize higher temperatures and less additive to obtain the desired level of sterilization.

Also affecting the amount of the additive to be employed is the type of spoilage to which the food is susceptible. High, medium and low acid foods for example, such as tomatoes, peas, corn and milk may exhibit flat-sour spoilage wherein surviving spores germinate and produce acid but no gas during growth. In other cases putrefactive anaerobic spore-forming bacteria lead to swelling of the container and putrid odors. Acid foods on the other hand show somewhat different spoilage. In this instance, acid-tolerant spore-formers may produce abnormally high amounts of acid without swelling the container. Nonspore formers, such as yeasts, moulds and lactic acid bacteria, may spoil container contents with or without container swelling.

Also affecting the amount of the additive to be employed is the composition, i.e., the chemical makeup of the foodstuff employed. For example, it has been found that if a foodstuff has a high fat content, it may be necessary to utilize a greater amount of the additive. This is thought to be due to the fact that the additive is withdrawn from the liquid medium surrounding the foodstuff and taken into the fat content of the foodstuff. Experimentation with vaseline overlay of broth medium in glass tubes in the presence of the propyl and heptyl esters of p-hydroxybenzoic acid indicated that the vaseline reduced the inhibitory power of the compound. These esters are known to be very soluble in oils. A concentration of 100 p.p.m. heptyl ester gave a cloudy suspension in media because it would not dissolve completely. However, tubes containing this much heptyl ester in T-BEST medium sealed with vaseline were found to become clear after 72 hours incubation at 98° F., while tubes without vaseline remained cloudy. This seemed to indicate absorption of the heptyl ester into the vaseline. The heptyl ester was soluble in the medium up to about 16 p.p.m. at room temperature. As shown in the following Table, Putrefactive Anaerobe No. 3679 grew in vaseline-sealed tubes of T-BEST broth medium containing 16 p.p.m. heptyl ester, while growth in non-overlayed tubes was inhibited by 4 p.p.m. of the chemical during 10 days incubation.

THE GROWTH OF PUTREFACTIVE ANAEROBE NO. 3679 IN GLASS TUBES CONTAINING MEDIUM IN THE PRESENCE OF THE HEPTYL ESTER OF p-HYDROXYBENZOIC ACID AFTER A MILD HEAT TREATMENT WITH AND WITHOUT VASELINE SEAL

|  | Parts per million of heptyl ester | | | | | |
| --- | --- | --- | --- | --- | --- | --- |
|  | 0 | 4 | 6 | 10 | 14 | 16 |
| Vaseline overlayed | + | + | + | + | + | + |
| No vaeline | + | − | − | − | − | − |

+ = Growth with gas.
− = No growth in 10 days at 98° F.
Medium = T-BEST broth.
Spore concentration = 20,000 per ml.

Also effecting the amount of ester to be employed is the type and size of container in which the foodstuff is to be placed. Chemical analysis of the heptyl ester concentration in various types of containers gave the results shown in the following table. The heptyl ester (5 and 10 p.p.m.) was prepared in distilled water and filled into glass stoppered bottles, 211 x 400 mm. plain cans, and thermal-death-time (208 x 006) de-enameled cans. After sealing the cans under 25 inches of vacuum, all containers were held approximately 7 days before analysis. The results in the following table show that the heptyl ester tends to retain its initial concentration when stored in glass. Retention in plain cans is apparently influenced by the ratio of exposed can surface area to the volume of the container. A larger can surface area per unit volume of can contents contributed to the reduction of recoverable ester.

Effect of container type and size on the retention of the heptyl ester of p-hydroxybenzoic acid as determined by chemical analysis Original concentration:                                          P.p.m. recovered [1]
  10 p.p.m.:
    Glass stoppered bottle _____ 9.8
    211 x 400 plain can_____ 9.8
    TDT plain can _____ 7.6
  5 p.p.m.:
    Glass stoppered bottle _____ 5.0
    211 x 400 plain can_____ 5.0
    TDT plain can _____ 3.3

[1] Following approximately 7 days storage.

Processing methods of the particular additive system employed will also affect the concentration required.

Each of these factors will, as previously stated, affect the amount of the additive used.

In general, however, it may be stated that the amount employed will be in the range of about 1 to about 300 parts by weight of additive per million parts by weight of the foodstuff. It is also noted here that when employing a mixture of the esters the total amount of the esters present in the mixture will preferably fall within the range noted above although it is not limited thereto. The relative proportions of the esters present in the mixture will also vary over a wide range depending upon the variables noted above.

The additive may be added to the pack at any time prior to the sealing thereof. It is also possible, for example, to coat the inside of the container with the desired additive and then place the food contents in the container and seal. In a preferred aspect, the additive is intimately admixed with the foodstuff immediately prior to the canning, the foodstuff containing the additive is placed into the container and the container is sealed.

The form in which the additive is added to the container or to the foodstuff is not critical and may be in any form in which good contact between the additive and the food may be obtained, e.g. as a solution or dispersion. One method which is employed is to dissolve or disperse the desired amount of additive in a solvent or carrier such as will not affect the quality of the foodstuff, e.g. propylene glycol, and then add the solution or dispersion in the most acceptable manner.

The instant invention is applicable to all types of canned foodstuffs, e.g., fruits and vegetables, eggs, fish, dairy products, poultry, meats and the like. When employing the term "foodstuff" in the instant specification and claims it is intended to encompass all types of edible foods which are suitable for canning.

When employing the term "container" in the instant specification and claims it is intended to refer to any container useful in the canning of foodstuffs. It may be a tin can, glass container, plastic or aluminum can, flexible plastic pouch or the like.

When using the terms "canned" and "canning" in the instant specification and claims it is intended to refer to the article or to the process including the steps of producing an article wherein the food is placed into a container and the container is hermetically sealed either in the presence or absence of vacuum. The terms are inclusive of an article or a process of producing an article requiring heat processing but is not limited to processing including that step.

Throughout the entire disclosure the relationship between parts by weight and parts by volume is the same as that between grams and milliliters; parts per million (p.p.m.) is uniformly parts by weight of additive per million parts by weight of finished product.

The following examples are intended to be merely illustrative of the claimed invention and are not exhaustive thereof.

Example 1

A dispersion of n-heptyl para-hydroxybenzoate in propylene glycol is prepared. Varying amounts of this dispersion are added to cans of peas which have been inoculated with from 1,000 to 2,000,000 spores per 011–400 can of various types and strains of *Clostridium botulinum*. These varying amounts of the solution are chosen to achieve a concentration of from 2 to 100 parts of the ester per million parts of the final product (p.p.m.).

The cans are hermetically sealed and heated to a temperature of 200° F. and held at this tempearture for 15 minutes. The cans are removed from the heat, cooled and placed in storage for up to two years. During this period of storage it will be found that spoilage of some of the cans will be indicated by swelling. When this occurs, these cans are removed, opened and the contents examined. At the end of this period the remaining cans are opened and examined for microbial content upon which a determination of spoilage or lack of spoilage is based. The results of the tests are recorded in Table I.

Note that in all cases some microbiological control is obtained. In the cases where a maximum level of inocula and a low level of ester pertained, spoilage eventually occurred.

TABLE I

[Spoilage in Botulinum inoculated peas canned with n-heptyl p-hydroxybenzoate and 200° F. for 15 min.]

| No. of spores per 011–400 can | P.p.m. ester | Percent spoilage |
| --- | --- | --- |
| 1,000 | 0 | 100 |
| 1,000 | 2 | 0 |
| 1,000 | 10 | 0 |
| 1,000 | 100 | 0 |
| 1–2 million | 0 | 100 |
| Do | 2 | 20 |
| Do | 10 | 6 |
| Do | 20 | 4 |
| Do | 100 | 0 |

Example 2

A stock solution (1000 p.p.m.) of n-heptyl para-hydroxybenzoate is made by dissolving 0.1 gram in 100 milliliters of 95% alcohol.

Next a ten TDT-tube (208 x 006 mm.) series containing canned beef bouillon is sterilized by autoclaving, and then cooled. The pH of each tube is about 7.0 after autoclaving. To each of the ten TDT tubes is added a quantity of stock solution to achieve a 15 p.p.m. concentration of n-heptyl para-hydroxy-benzoate. Ten TDT tubes containing canned beef bouillon but no heptyl ester are sterilized in the same manner and used as controls. Each of the TDT tubes are then inoculated with Putrefactive Anaerobe No. 3679 spores to achieve a spore concentration of 20,000 per mil. Heating is carried out at 250° F. in an oil bath 0, 3, 6, 8, 10 and 12 minutes time intervals. After heating, the tube are water cooled and incubated at 85° F. under a 25-inch vacuum. Results show that although the controls at the zero time were positive and three-minute control tubes were positive, neither the zero time tubes nor any others were positive with 15 p.p.m. of n-heptyl para-hydroxybenzoate. No change took place even after 6 months of incubation.

Example 3

The same test as in Example 2 is repeated at 230° F. using a five tube series and time intervals of 0, 2, 4, 6, 9, 12, 15, and 20 minutes. Growth is obtained through 6 minutes in the control series of tubes, but no tubes (including the zero time) were positive with 15 p.p.m. of the heptyl ester. No change took place even after 6 months of incubation.

Example 4

A test was run on P.A. 3679 spores at 250° F. using liver broth as the medium and including 1% alcohol controls. The concentration of n-heptyl para-hydroxybenzoate (from the stock solution of Example 2) was 0 and 10 p.p.m. in a ten tube series (sterilized as in Example 2), and the heating times were at one minute intervals from 0 through 8 minutes. Two ml. quantities of liver broth containing 20,000 spores were used per TDT tube. Incubation was carried out as in Example 2. The results are shown in Table 1. All of the control tubes through 6 minutes showed growth within 4 days, and within 7 days 5 tubes were positive at 7 minutes and 2 tubes were positive at 8 minutes heating at 250° F. Later, 2 more control tubes spoiled, making a total of 4 tubes positive of 10 through 8 minutes at 250° F. With 10 p.p.m. of heptyl ester, 2 tubes showed growth at 2 minutes after 7 days of incubation and all 10 tubes became positive at 2 minutes after 21 days of incubation. After 18 days of incubation, 2 tubes became positive at the 3 minute intervals. No more of the tubes containing the heptyl ester have become positive. Two tubes containing 10 p.p.m. of heptyl ester which had been heated for 4 minutes at 250° F. were subcultured; these became positive one month after subculturing indicating a residual inhibition rather than complete destruction. The remaining tubes under incubation for an additional 3 months shown no growth. The results on the alcohol-control tubes compared with the heptyl ester tubes indicate that there was at least a 4 minute advantage at 250° F. in preventing the outgrowth of spores of P.A. 3679 in liver broth.

TABLE 1.—EFFECT OF A COMBINATION OF STRONG HEAT AND HEPTYL ESTER ON GROWTH OF P.A. NO. 3679 SPORES IN GLASS TUBES OF LIVER BROTH

| | No. of tubes positive/No. of tubes tested—heating time in minutes at 250° F. | | | | | | | | |
| --- | --- | --- | --- | --- | --- | --- | --- | --- | --- |
| | 0 | 1 | 2 | 3 | 4 | 5 | 6 | 7 | 8 |
| Control (no alcohol or heptyl ester) | 9/9 | 10/10 | 10/10 | 10/10 | 10/10 | 10/10 | 10/10 | 5/10 | 4/10 |
| Alcohol control (1%) | 10/10 | 10/10 | 10/10 | 9/9 | 8/8 | 9/9 | 8/9 | 2/10 | 0/10 |
| 10 p.p.m. heptyl ester | 10/10 | 10/10 | 10/10 | 2/10 | 0/10 | 0/10 | 0/10 | 0/10 | 0/10 |

Example 5

A test was made to determine the effect of a combination of the heptyl ester with strong heat on *B. stearothermophilus* No. 1518 in liver broth. The heating temperature was 250° F. in an oil bath and the heating times were at 5 minute intervals through 40 minutes. Heptyl ester concentrations were 0 and 7 p.p.m. and incubation was at 131° F. Each TDT tube contained 2 ml. of liver broth and 20,000 spores. A ten tube series was used and a 0.7% alcohol control was included (the same amount present in the tubes containing the heptyl ester). The data are given in Table 2 and show a 6 to 10 minute advantage in halting flat sour growth by using 7 p.p.m. heptyl ester in combination with 250° F. heating in liver broth.

TABLE 2.—EFFECT OF A COMBINATION OF STRONG HEAT AND HEPTYL ESTER ON GROWTH OF B.S. NO. 1518 SPORES IN GLASS TUBES OF LIVER BROTH

| | No. of tubes positive/No. of tubes tested— minutes at 250° F. | | | | | |
| --- | --- | --- | --- | --- | --- | --- |
| | 0 | 5 | 10 | 15 | 20 | 25 |
| Control (no alcohol or heptyl ester) | 10/10 | 10/10 | [1] 6/10 | 0/10 | 0/10 | 0/10 |
| Alcohol control (0.7%) | 10/10 | 10/10 | [1] 1/10 | 0/10 | 0/10 | 0/10 |
| 7 p.p.m. heptyl ester | [1] 3/10 | 0/10 | 0/10 | 0/10 | 0/10 | 0/10 |

[1] A sufficient time (3 months) was permitted to elapse, since the last positive tube appeared, indicating that no more positive tubes would appear.

What is claimed is:
1. A method for preserving canned foodstuff subject to spoilage from spore forming bacteria against undesirable microbial growth which comprises:
(a) adding to and intimately admixing with the foodstuff a compound of the formula:

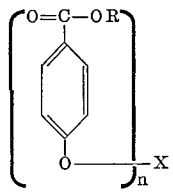

wherein
R represents an n-alkyl group of 7 to 8 carbon atoms;
X represents a member selected from the group consisting of hydrogen, alkali metal and alkaline earth metal; and
n is an integer equal to the valence of X;
(b) placing the foodstuff containing the said compound into a container;
(c) hermetically sealing said container; and
(d) heat processing the container at a temperature and for a time period such that the amount of heat imparted to the foodstuff is significantly lower than that normally employed in preserving the foodstuff in the absence of the said compound.

2. A method for preserving canned foodstuff subject to spoilage from spore forming bacteria against undesirable microbial growth which comprises:
(a) adding to and intimately admixing with the foodstuff a mixture of at least one compound of the formula:

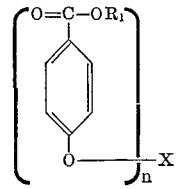

wherein
$R_1$ represents an alkyl group of 1 to 6 carbon atoms;

X represents a member selected from the group consisting of hydrogen, alkali metal and alkaline earth metal; and
n is an integer equal to the valence of X, with a compound of the formula

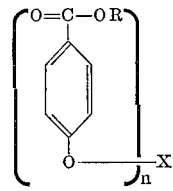

wherein
X and n have the previously indicated significance; and
R is n-alkyl of 7 to 8 carbon atoms;
(b) placing the foodstuff containing the said compound into a container;
(c) hermetically sealing said container; and
(d) heat processing the container at a temperature and for a time period such that the amount of heat imparted to the foodstuff is significantly lower than that normally employed in preserving the foodstuff in the absence of the mixture of said compounds.

References Cited

UNITED STATES PATENTS 3,054,678    9/1962    Michener et al. ____ 99—224 X
3,175,912    3/1965    Strandskov et al. ____ 99—224 X

OTHER REFERENCES

Huppert: "Antibiotics and Chemotherapy," vol. VII, No. 1, January 1957, p. 29 to 36, inclusive, article entitled The Antifungal Activity of A Homologous Series of Parabens.

Neidig et al.: "The Drug and Cosmetic Industry," April 1944, p. 482, article entitled, Food Preservation.

HYMAN LORD, *Primary Examiner.*

U.S. Cl. X.R.

99—150, 154, 157, 158, 161, 186, 187, 188, 211, 214